United States Patent
Lundström et al.

(10) Patent No.: US 10,200,519 B2
(45) Date of Patent: Feb. 5, 2019

(54) SYSTEMS AND METHODS FOR DYNAMIC SWITCHING OF CODEC MODES OF OPERATION USED BY A TERMINAL

(71) Applicant: Telefonaktiebolaget LM Ericsson (publ), Stockholm (SE)

(72) Inventors: Johan Lundström, Pargas (FI); David Sjöstrand, Mariehamn (FI); Mikko Viitanen, Espoo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 247 days.

(21) Appl. No.: 15/234,385

(22) Filed: Aug. 11, 2016

(65) Prior Publication Data
US 2018/0048748 A1 Feb. 15, 2018

(51) Int. Cl.
*H04M 1/253* (2006.01)
*H04L 29/06* (2006.01)
*H04W 80/10* (2009.01)

(52) U.S. Cl.
CPC ...... *H04M 1/2535* (2013.01); *H04L 65/1006* (2013.01); *H04L 65/1069* (2013.01); *H04L 65/607* (2013.01); *H04L 65/80* (2013.01); *H04L 65/608* (2013.01); *H04W 80/10* (2013.01)

(58) Field of Classification Search
CPC ...... H04M 1/2535; H04L 65/80; H04W 80/10
USPC ........................................................... 370/252
See application file for complete search history.

(56) References Cited

U.S. PATENT DOCUMENTS

| | | | |
|---|---|---|---|
| 2014/0188488 A1* | 7/2014 | Schug | G10L 19/008 704/500 |
| 2016/0105468 A1* | 4/2016 | Mufti | H04L 65/1069 709/228 |
| 2016/0105968 A1 | 4/2016 | Mufti et al. | |
| 2016/0119384 A1* | 4/2016 | Karimli | H04L 65/1069 370/252 |
| 2016/0308919 A1* | 10/2016 | Hori | H04L 65/1006 |

OTHER PUBLICATIONS

Ray, N., "Patent-Pending: T-Mobile's Next Network Upgrade With Enhanced Voice Services", Apr. 6, 2016, 3 page.
Bruhn, S., et al., "System Aspects of the 3GPP Evolution Towards Enhanced Voice Services", Dec. 14, 2015, 6 pages.
Nokia Networks, "The 3GPP Enhanced Voice Services (EVS) Codec", 2015, 24 pages.

* cited by examiner

*Primary Examiner* — Chi Tang P Cheng
(74) *Attorney, Agent, or Firm* — Rothwell, Figgs, Ernst & Manbeck, P.C.

(57) ABSTRACT

Systems and methods for dynamically causing a terminal to change audio codec modes during a session with another terminal. In one aspect, the terminal is forced use to switch to a more resilient audio codec mode when the quality of wireless channel being used by the terminal deteriorates below a threshold.

21 Claims, 6 Drawing Sheets

SYSTEMS AND METHODS FOR DYNAMIC SWITCHING OF CODEC MODES OF OPERATION USED BY A TERMINAL

TECHNICAL FIELD

Aspects of this disclosure relate to systems and methods for dynamic switching of codec modes of operation used by a terminal (e.g., switching the codec used by the terminal or switching an encoding mode used by the terminal).

BACKGROUND

Enhanced Voice Services (EVS) is a new codec specified by the $3^{rd}$ Generation Partnership Project (3GPP). One of the features of the EVS codec (or "EVS" for short) is that EVS provides significantly better frame error and packet error resilience than legacy codecs, resulting in better radio coverage. With respect to voice calls, for example, this feature translates into improved voice call reliability in areas of weak signals, which means dropped calls will happen infrequently.

SUMMARY

Assuming the network supports EVS, EVS is usually selected at voice call establishment when both the calling terminal and the called terminal support EVS. This means that the number of EVS calls will be fairly low until terminals supporting EVS become common and all networks start supporting EVS. Therefore, consumers may have to wait a long time before they will be able to enjoy the better audio quality and radio coverage provided by EVS.

In order to mitigate the problem described above, some network force EVS capable terminals to use an EVS primary encoding mode for a voice call even where the other terminal involved in the call does not support EVS, meaning that the network will employ transcoding (i.e., converting EVS encoded data to an encoding supported by the other terminal if the other terminal does not support EVS). This will improve the audio quality for EVS terminals in areas with bad radio coverage (e.g., areas with high packet errors). However, for terminals in good radio coverage, the audio quality will suffer due to the transcoding. Additionally, transcoding is usually associated with a high hardware cost.

Accordingly, in some embodiments, rather than force an EVS capable terminal to use an EVS primary encoding mode, the network forces the EVS terminal to use the AMR-WB interoperable (AMR-WB IO) encoding mode, which provides enhanced AMR-WB backward compatible operation. That is, encoded audio data generated by an EVS AMR-WB IO encoder can be decoded by an AMR-WB decoder without the need for transcoding, and frames generated by an AMR-WB encoder can be decoded by an EVS AMR-WB IO decoder without the need for transcoding.

After forcing the EVS capable terminal to use the AMR-WB IO encoding mode, the network monitors network performance (e.g., packet errors, such as packet loss, packet jitter, and/or other network performance indicators) in the direction from the EVS terminal (i.e., the uplink direction). When the network determines that the network performance has sufficiently deteriorated (e.g., packet errors and/or jitter exceed a predefined threshold, such as 3% as an example), the network triggers the EVS terminal to cease using the AMR-WB IO encoding mode and start using one of the EVS primary encoding modes (e.g. 13.2 kbps channel aware) (i.e., switch between AMR-WB IO mode and an EVS primary mode). Transcoding would also be initiated in the network at this point in time. In some embodiments, the triggering of the mode switch is done only for the direction that suffers from packet errors in order to save transcoding resources in the network. In case of high packet errors on the uplink (e.g. >5%), it can be assumed that also packets on the downlink are lost and a change to EVS primary mode may also be done for the downlink.

In other embodiments, rather than force an EVS capable terminal to use EVS (EVS primary or AMR-WB TO), the network allows the EVS capable terminal to select to use another codec for the call (e.g., AMR when the other terminal supports only AMR) and then monitors the network performance. When the performance falls below a threshold, the network instructs the EVS terminal to switch its codec mode of operation—e.g., to switch from using an AMR codec to using an EVS primary mode—and begins transcoding (i.e., converting the EVS encoded data to AMR encoded data). When the quality of the link later improves, the EVS terminal is instructed to switch back to AMR.

Advantages provided the embodiments described herein include better coverage and quality for audio sessions in mobile networks. At least the following users will benefit from better audio quality: 1) users with EVS phones for VoLTE and/or WiFi calling and 2) users with non-EVS capable phones (2G, 3G or VoLTE) communicating with a person using an EVS phone. The user of the non-EVS phone can be in the same network as the EVS phone or in a different network.

Accordingly, in one aspect there is provided a method for dynamic switching of codec modes of operation in a system comprising a first terminal and a second terminal. The method includes a network session function obtaining first codec support information indicating that the first terminal supports a first audio codec and obtaining second codec support information indicating that the second terminal supports a set of one or more audio codecs, wherein the audio codecs supported by the second terminal includes a second audio codec but does not include the first audio codec. After a session between the first and second terminals has been established and before the session is terminated, the network session function obtains link quality information (LQI) indicating a quality of a wireless channel between the first terminal and a radio access node, which wireless channel is used by the first terminal during the session to transmit encoded audio data to the second terminal.

A network session function (NSF) determines, based on the obtained LQI, that the first terminal should switch to a first codec mode of operation in which the first terminal encodes audio data for the session with the second terminal such that the resulting encoded audio data is incompatible with the each one of the audio codecs supported by the second terminal. As a result of determining based on the LQI that the first terminal should enter the first codec mode of operation, the NSF transmits to the first terminal first codec mode information for causing the first terminal to switch to the first codec mode of operation.

After transmitting the first codec mode information, the method includes receiving from the first terminal first encoded audio data, wherein the first encoded audio data was encoded by the first terminal in accordance with the first codec mode of operation. The method then includes decoding the first encoded audio data to produce decoded audio data, and encoding the decoded audio data to produce transcoded audio data compatible with the second audio codec. Encoding the decoded audio data to produce the transcoded audio data comprises encoding the decoded audio data using one of: i) an audio codec compatible with the second audio codec and ii) the second audio codec. The method further includes transmitting to the second terminal the transcoded audio data.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments.

DETAILED DESCRIPTION

Figure 1:
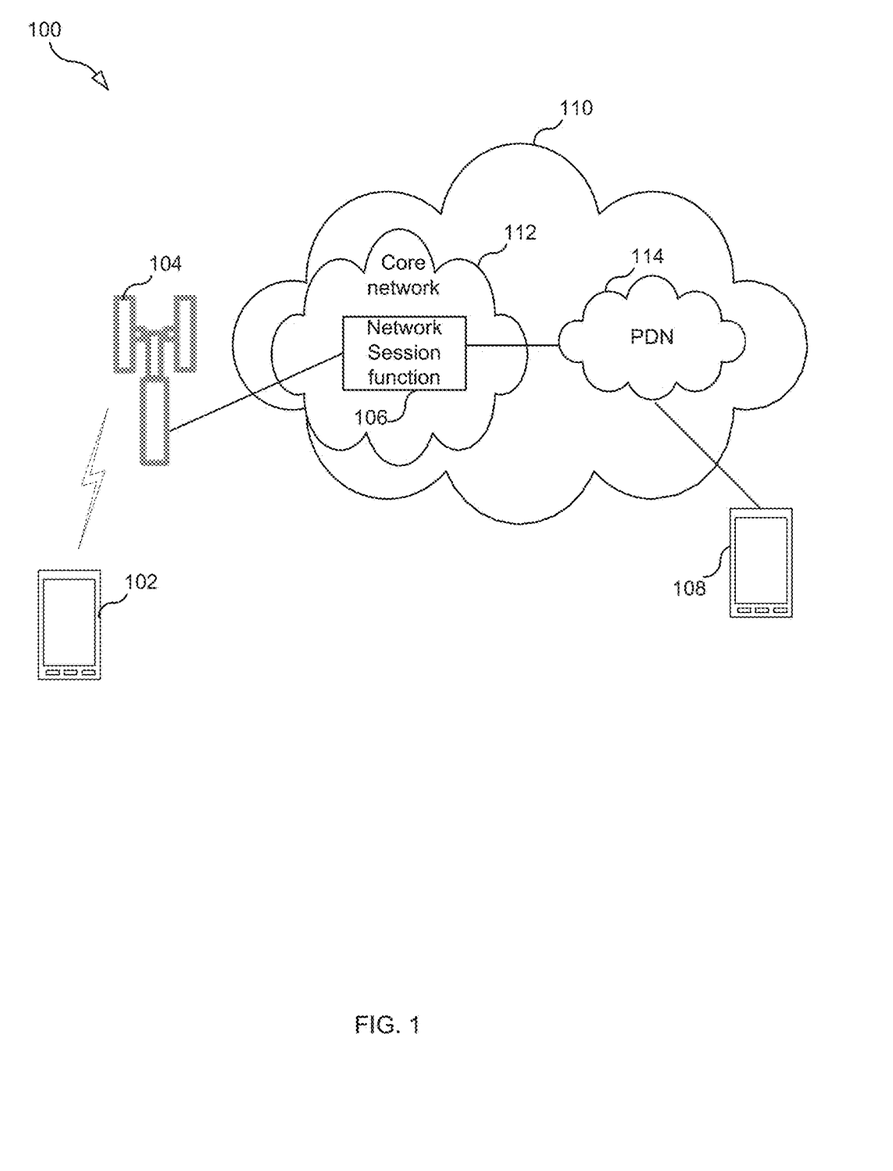
FIG. 1 illustrates a system according to some embodiments.

FIG. 1 illustrates a system 100 according to some embodiments. As shown in FIG. 1, system 100 includes a terminal 102 in the form of a wireless communication device (WCD) (e.g., smartphone, tablet, computer, or other wireless communication device) communicating with a another terminal 108 (which may or may not be a WCD) via a radio access node 104 (e.g., a cellular base station, a wireless access point, or other radio access node) and a network 110, which, in the embodiment shown includes an operator's core network 112 and a packet data network 114 (e.g., the Internet). In the embodiment shown, core network 112 includes a network session function (NSF) 106 located logically between terminals 102 and 108. NSF 106, in some embodiments, is used for establishing, managing, and terminating sessions (e.g., voice over IP (VoIP) calls) between terminals 102 and 108. NSF 106 in some implementations is a Session Border Controller (SBC). While not shown, system 100 may include another NSF located logically between terminals 102 and 108.

While terminal 108 is shown as being connected to network 114, this is not a requirement, as terminal 108, like terminal 102, may be attached to network 112 via access node 104 or different access node connected to network 112. In this example, we assume that terminal 102 includes an EVS coder (i.e., a software and/or hardware module that implements EVS), whereas terminal 108 does not include any EVS coder, but rather includes an AMR-WB coder. Thus, terminal 102 may be referred to as an EVS terminal.

Figure 2:
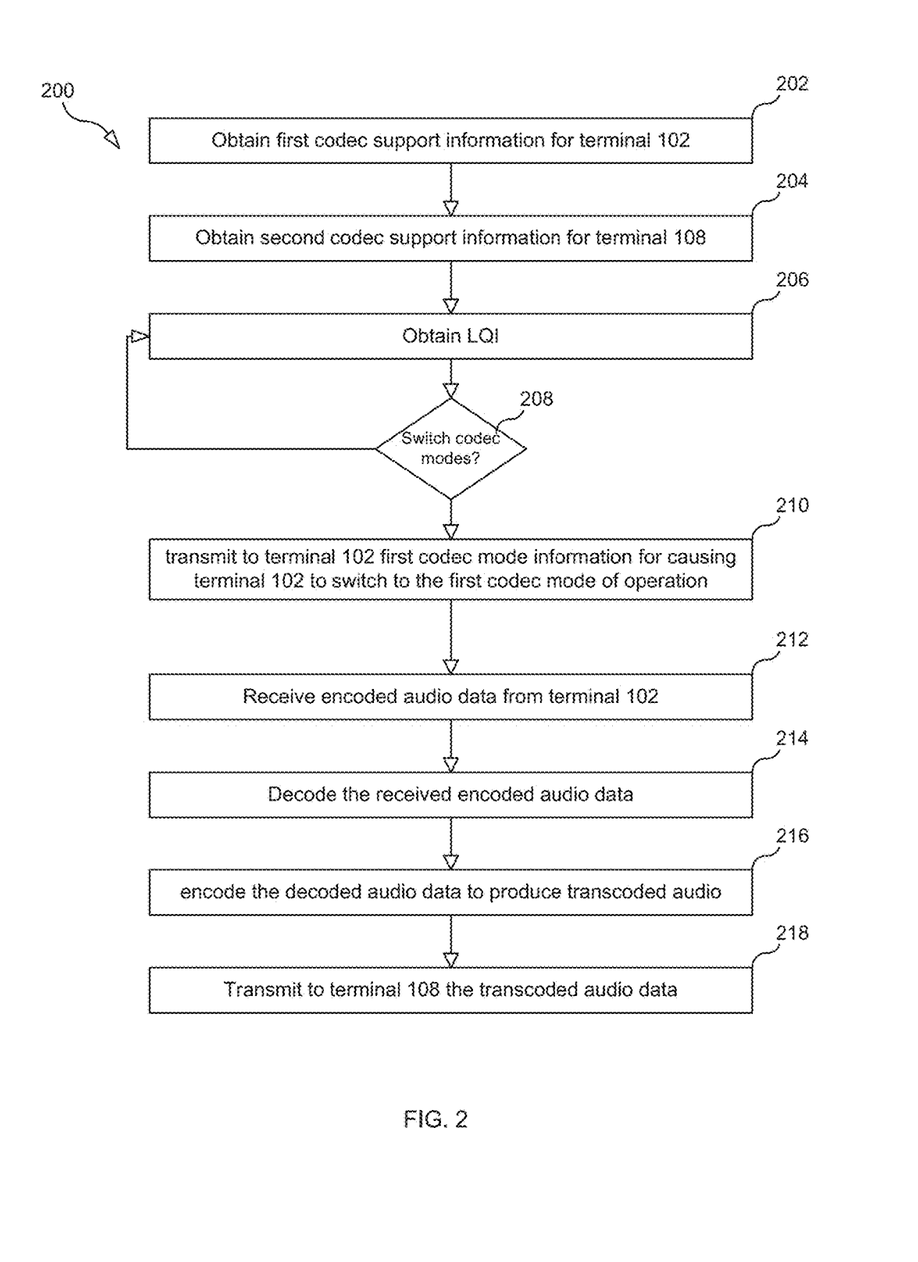
FIG. 2 is a flowchart illustrating a process according to some embodiments.

FIG. 2 is a flow chart illustrating a process 200, according to some embodiments, for dynamically switching codec modes.

Process 200 may begin with step 202 in which NSF 106 obtains first codec support information indicating that terminal 102 supports a first audio codec (in this example the first audio codec is EVS). For example, NSF 106 may obtain the first codec support information by receiving a message transmitted by terminal 102 to terminal 108, where the message includes the first codec support information. In some embodiments, the message is a session initiation message for establishing a session with terminal 108 (e.g., the message may be a Session Initiation Protocol (SIP) Invite or a response to a SIP invite). In embodiments in which the message received from terminal 102 is a session initiation message, NSF 106 may modify the message and then transmit the modified session initiation message to terminal 108. For example, the session initiation message received at NSF 106 from terminal 102 may include information identifying EVS as the codec chosen by terminal 102, and NSF may modify the session initiations message by replacing the information identifying EVS as the chosen codec with information identifying AMR-WB as the chosen codec.

In step 204, NSF 106 obtains second codec support information indicating that terminal 108 supports a second audio codec (in this example AMR-WB is the second audio codec) but does not support the first audio codec (i.e., EVS). For example, NSF 106 may obtain the second codec support information by receiving a message transmitted by terminal 102 to terminal 108, where the message includes the second codec support information indicating that terminal 108 supports the second audio codec but not the first audio codec (i.e., EVS). In some embodiments, the message is a session initiation message for establishing a session with terminal 102 (e.g., the message may be a Session Initiation Protocol (SIP) Invite or a response to a SIP invite). In embodiments in which the message received from terminal 108 is a session initiation message, NSF 106 may modify the message and then transmit the modified session initiation message to terminal 102. For example, the session initiation message received at NSF 106 from terminal 108 may include information identifying AMR-WB as the codec chosen by terminal 108, and NSF may modify the session initiations message by replacing the information identifying AMR-WB as the chosen codec with information identifying EVS as the chosen codec.

In step 206, after a session (e.g., a voice call) between terminals 102 and 108 has been established and before the session is terminated, NSF 106 obtains link quality information (LQI) indicating a quality of the wireless channel between terminal 102 and a radio access node (RAN) (e.g., RAN 104), which wireless channel is used by terminal 102 during the session to transmit encoded audio data to the terminal 108. In some embodiments, the LQI comprises packet error data and/or packet jitter data. For example, the packet error data may include information identifying a packet error (e.g., packet loss) percentage in the uplink direction (i.e., transmissions from terminal 102 to the RAN) and/or information identifying a packet error percentage in the downlink direction (i.e., transmissions from the RAN to terminal 102).

In step 208, NSF 106 determines, based on the obtained LQI, whether terminal 102 should switch to a first codec mode of operation in which terminal 102 encodes audio data for the session such that the resulting encoded audio data is incompatible with the second audio codec supported by terminal 108. For example, if the LQI indicates that the quality of the wireless channel in the uplink or downlink direction is below a threshold (e.g., packet error is greater than a packet error threshold), then NSF 106 determines that terminal 102 should enter the second codec mode of operation.

In step 210, as a result of determining based on the LQI that terminal 102 should enter the first codec mode of operation, NSF 106 transmits to terminal 102 first codec mode information for causing terminal 102 to switch to the first codec mode of operation.

In step 212, after transmitting the first codec mode information, NSF 106 receives from terminal 102 second audio data comprising second encoded audio data encoded by terminal 102 in accordance with the first codec mode of operation. For example, in step 216, NSF 106 receives an RTP (Real-time Transport Protocol) packet comprising an RTP Payload that includes an RTP payload header and the second encoded audio data.

In step 214, NSF 106 decodes the second encoded audio data received in step 212 to produce decoded audio data.

In step 216, NSF 106 encodes the decoded audio data using one of: i) an audio codec compatible with the second audio codec and ii) the second audio codec to produce transcoded audio data.

In step 218, NSF 106 transmits to terminal 108 the transcoded audio data compatible with the second audio codec. For example, if in step 212 NSF 106 received the RTP packet, then in step 218, NSF 106 may modify the received RTP packet and transmit to terminal 108 the modified RTP packet. NSF 106 may modify the RTP packet by replacing the second encoded audio data with the transcoded audio data. NSF 106 may further modify the RTP packet by modifying a CMR (Codec Mode Request) field of the RTP payload header.

Figure 3:
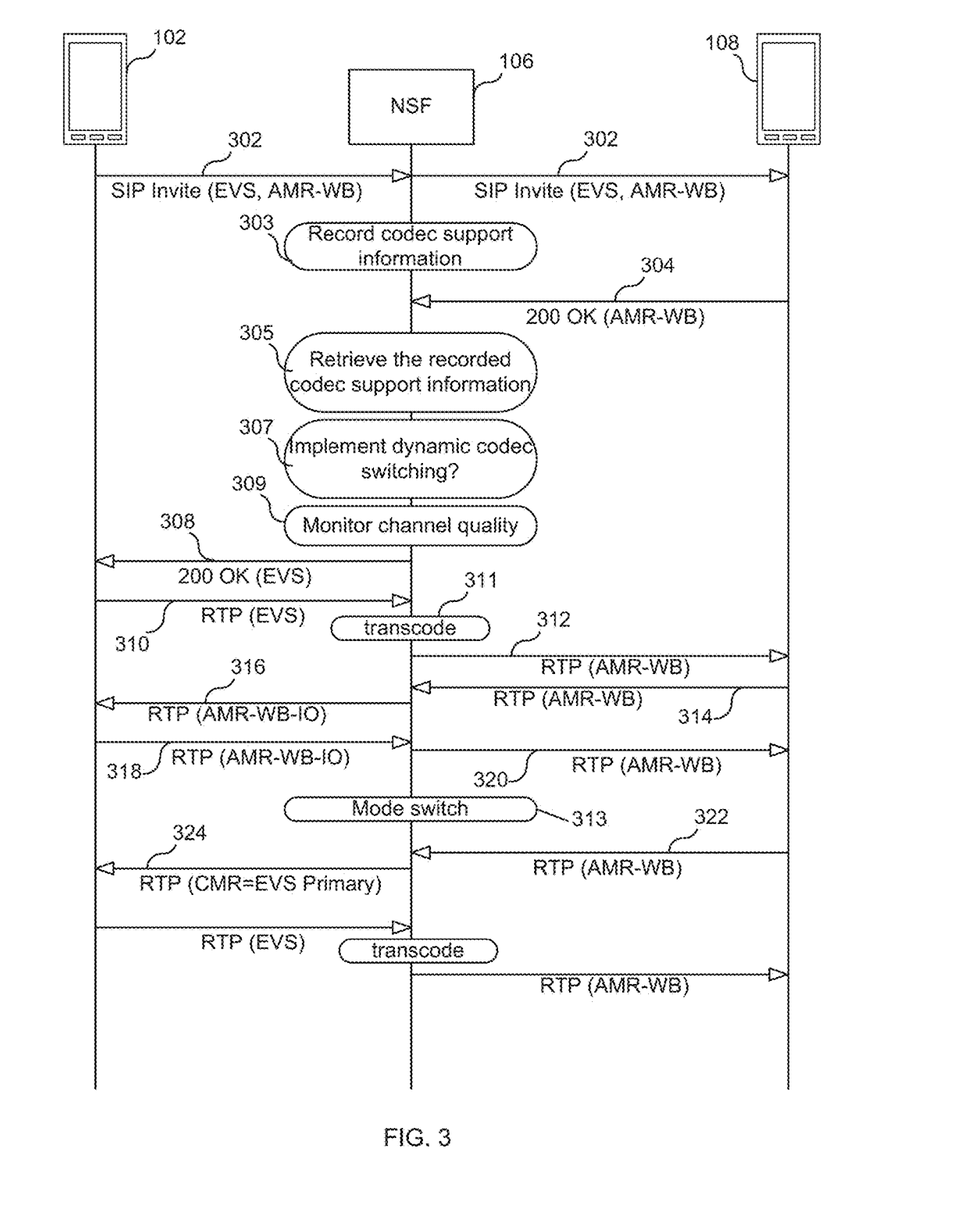
FIG. 3 is a message flow diagram illustrating a message flow according to some embodiments.
Figure 4:
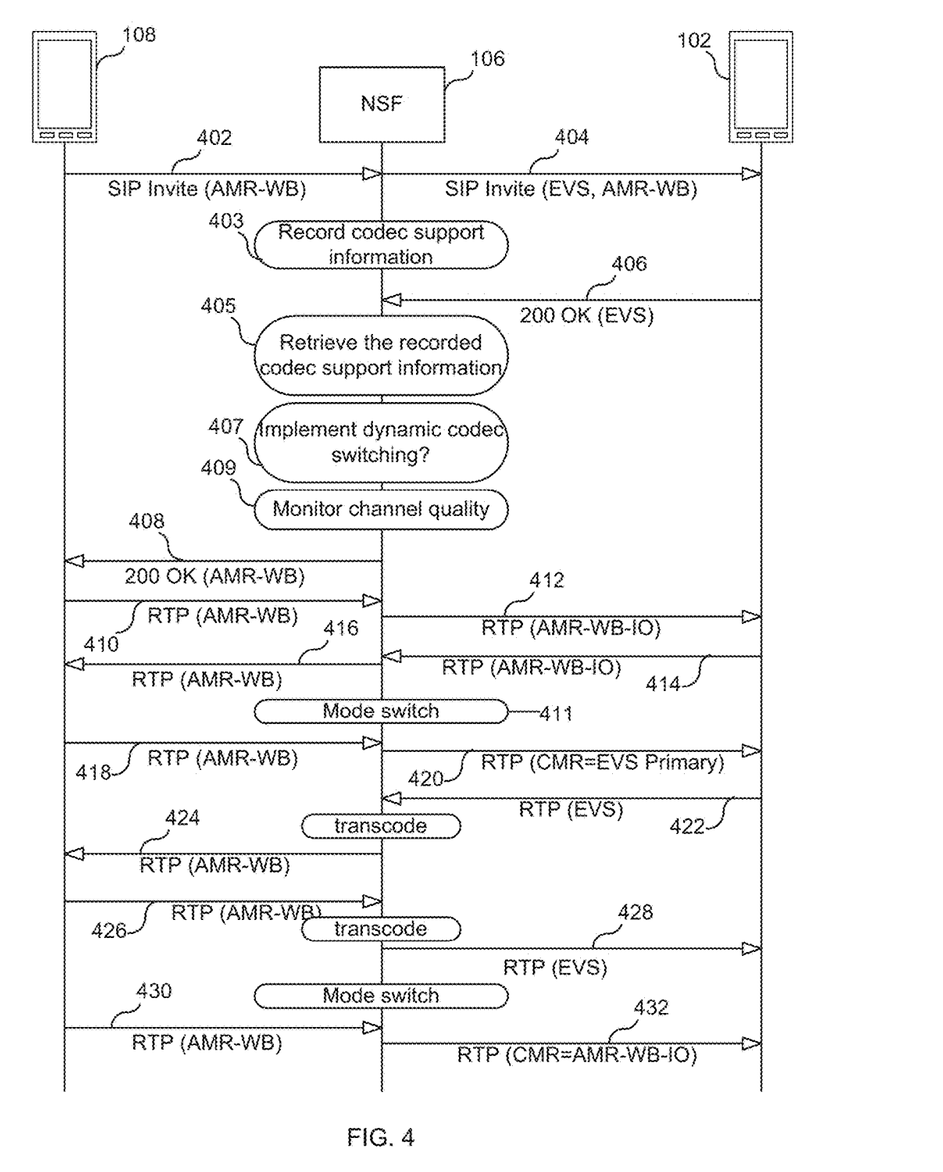
FIG. 4 is a message flow diagram illustrating a message flow according to some embodiments.
Figure 5:
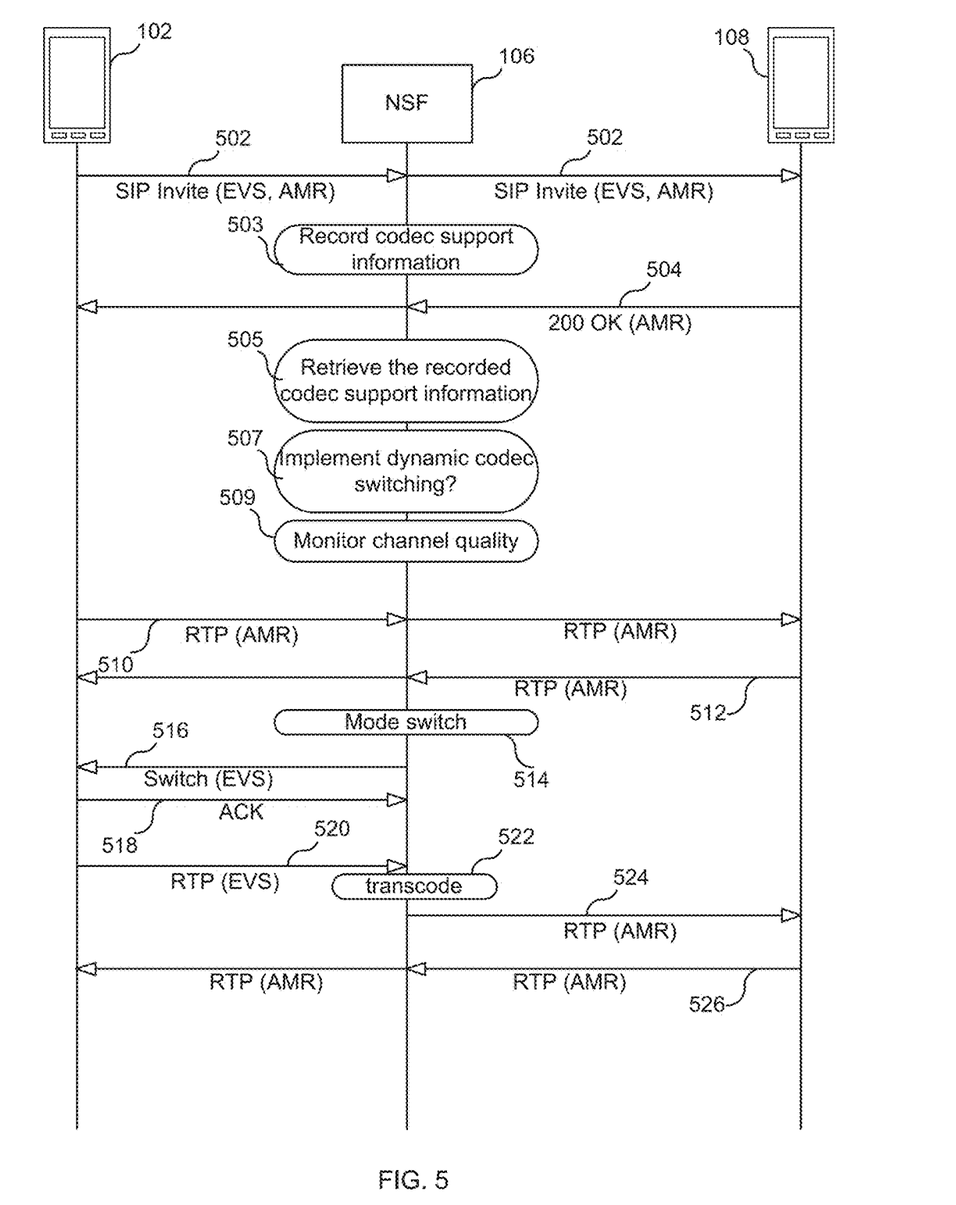
FIG. 5 is a message flow diagram illustrating a message flow according to some embodiments.

FIG. 3, FIG. 4, and FIG. 5 each illustrate message flows for certain specific embodiments of the more general embodiment discussed above with respect to FIG. 2.

Referring now to FIG. 3, FIG. 3 is a message flow diagram illustrating a process according to some embodiments. In this example, terminal 102 is initiating a session (a voice call) with terminal 108. The process as shown begins with terminal 102 transmitting a SIP Invite 302 to terminal 108. NSF 106 receives the SIP Invite message, which includes codec support information indicating that terminal 102 supports the first audio codec (i.e., EVS) and the second audio codec (i.e., AMR-WB). Specifically, in this example, the SIP Invite message includes a Session Description Protocol (SDP) message that contains one or more attributes of a media descriptor, which attribute(s) contain the codec support information. Next, NSF 106 forwards the SIP Invite to terminal 108.

Additionally, NSF 106 may record in a database (e.g., a file or other database) at least some of the codec support information (step 303). In this example, NSF 106 records in the database information indicating that terminal 102 supports EVS. In this way, when NSF 106 receives from terminal 108 its response to the Invite, NSF 106 can determine the extent to which the codec(s) supported by terminal 102 are compatible with the codec(s) supported by terminal 108.

Terminal 108 receives the SIP Invite and responds to the Invite by transmitting a SIP response 304. In this example, the SIP response is a SIP 200 OK message containing an SDP message comprising codec support information indicating that terminal 108 supports the second audio codec (i.e., AMR-WB), but not EVS.

NSF 106 receives the SIP response 304 thereby obtaining the codec support information included in the SIP response. Based on information included in the SIP response (e.g., information for identifying terminal 102), NSF 106 retrieves the codec support information stored in step 303 (step 305). In step 307, NSF 106 uses the retrieved codec support information and the codec support information included in the SIP response to determine whether NSF 106 should enter a dynamic codec switching mode operation (e.g., perform steps 210-222). In one embodiment, NSF 106 determines that it should enter a dynamic codec switching mode operation as a result of determining that terminal 102 supports EVS, while terminal 108 does not support EVS but supports AMR-WB.

In the embodiment shown, as a result of NSF 106 determining that it should enter the dynamic codec switching mode operation, NSF 106 begins monitoring (directly or indirectly) the quality of the wireless channel used by terminal 102 to communicate with terminal 108 (step 309). For example, as discussed above, NSF 106 may monitor packet error percentages and/or packet jitter (i.e., variations in packet delay).

In addition, in the embodiment shown, NSF 106 modifies the SIP response and transmits the modified SIP response 308 to terminal 102. In such embodiments, the modified SIP response may be identical to the original SIP response with the exception of the codec support information. For example, the modified SIP response includes codec support information that comprises information identifying EVS as an available codec. This feature, will cause terminal 102 to use its EVS coder to encode audio data for the voice call with terminal 108 because it "tricks" terminal 102 into believing that terminal 108 supports EVS. In other embodiments, NSF 106 does not modify the SIP response but merely forwards it to terminal 102.

Next, terminal 102 transmits to terminal 108 audio data comprising encoded audio data encoded using an EVS Primary mode. In this case the audio data is an RTP packet 310. NSF 106 receives the RTP packet, performs transcoding to produce a modified RTP packet that includes the transcoded audio data, and transmits the modified RTP packet to terminal 108. That is, after receiving the RTP packet, NSF 106 extracts the encoded audio data from the packet, decodes the audio data, and re-encodes the decoded audio data using AMR-WB codec to thereby generate the transcoded audio data (step 311). NSF 106 then generates the modified RTP packet 312, which contains the transcoded audio data, and transmits the modified RTP packet 312 to terminal 108.

Next, terminal 108 transmits to terminal 102 audio data, in the form of an RTP packet 314, comprising encoded audio data encoded using an AMR-WB. NSF 106 receives RTP packet 314. Instead of simply forwarding RTP packet 314 to terminal 102, NSF 106 modifies the RTP packet and transmits to terminal 102 the modified packet 316 so as to cause terminal 102 to start using the EVS AMR-WB IO mode for the call. In this example, NSF 106 modifies the RTP packet by replacing information in the CMR field of the RTP payload header with information to cause terminal 102 to start using the EVS AMR-WB IO mode for the call and then transmits to terminal 102 the modified RTP packet. In this way, NSF 106 will not need to perform transcoding.

Next, terminal 102 transmits to terminal 108 an RTP packet 318 comprising encoded audio data encoded according to the EVS AMR-WB IO mode. NSF 106 receives packet 318 and modifies the packet so that it appears that terminal 102 is using AMR-WB instead of EVS AMR-WB IO mode and transmits the modified packet 320 to terminal 108.

Meanwhile, as the call between terminals 102 and 108 continues, NSF 106 is continually monitoring the channel quality, as described above. In step 313, NSF 106 determines that the channel quality has sufficiently deteriorated that it should now request terminal 102 to switch back to using an EVS Primary mode for the call (e.g., packet error percentage has exceeded a threshold). Accordingly, when NSF 106 receives an RTP packet 322 transmitted by terminal 108 as part of the call, NSF 106 modifies the RTP packet 322 and transmits to terminal 102 the modified RTP packet 324, which includes information (e.g., information in a CMR field) causing terminal 102 to switch to an EVS Primary mode. From this point onward, until terminal 102 switches back to AMR-WB IO mode, NSF 106 will perform transcoding as described above.

When the quality of the channel sufficiently improves, NSF 106 will use the same technique of modifying an RTP packet transmitted by terminal 108 to cause terminal 102 to switch back to the AMR-WB IO mode. In other embodiments, rather than using in-band (IB) signaling as described above to cause terminal 102 to switch encoding modes, NSF 106 can use out-of-band (OOB) messages (e.g., RTP Control Protocol (RTCP) messages, SIP messages, etc.). In embodiments in which NSF 106 uses OOB messages to control the behavior of terminal 102, NSF 106 need not modify any of the audio data messages (e.g., RTP packets).

In this manner, NSF 106 implements dynamic codec switching which has the advantage of minimizing the amount of time that NSF 106 needs to perform transcoding, while taking advantage of EVS when it is most needed.

In some embodiments, in addition to causing terminal 102 to switch to an EVS Primary mode for uplink data when the channel quality falls below a first certain threshold (e.g., packet error exceeds a certain packet error threshold (e.g., 3%)), NSF 106 can be configured to transcode the AMR-WB encoded audio data received from terminal 108 and destined for terminal 102 into EVS Primary encoded audio data and send to terminal 102 the EVS Primary encoded audio data rather than the original AMR-WB encoded audio data. In some embodiments, NSF 106 performs this additional feature of transcoding in the downlink only if the channel quality falls below a second certain threshold that is lower than the first certain threshold (e.g., packet error exceeds 5%).

Referring now to FIG. 4, FIG. 4 is a message flow diagram illustrating a process according to some embodiments. In this example, terminal 108 is initiating a session (a voice call) with terminal 102. The process as shown begins with terminal 108 transmitting a SIP Invite 402 to terminal 102. NSF 106 receives the SIP Invite message, which includes codec support information indicating that terminal 108 supports AMR-WB but not EVS. Specifically, in this example, the SIP Invite message includes a Session Description Protocol (SDP) message that contains one or more attributes of a media descriptor, which attribute(s) contain the codec support information.

Next, NSF 106 modifies the SIP Invite and transmits to terminal 102 the modified SIP Invite 404. The modified SIP Invite 404 includes codec support information indicating to terminal 102 that terminal 108 supports EVS in addition to AMR-WB even though terminal 108 does not support EVS. This feature, will cause terminal 102 to use its EVS coder to encode audio data for the voice call with terminal 108 because it "tricks" terminal 102 into believing that terminal 108 supports EVS.

Additionally, NSF 106 may record in a database information indicating that terminal 108 does not support EVS (step 403). In this way, when NSF 106 receives from terminal 102 its response to the Invite 404, NSF 106 can determine whether it should implement dynamic codec switching.

Terminal 102 receives the SIP Invite 404 and responds to the Invite by transmitting to terminal 108 a SIP response 406. In this example, the SIP response 406 is a SIP 200 OK message containing an SDP message comprising codec support information indicating that terminal 102 is requesting use of EVS for the call.

NSF 106 receives the SIP response 406 thereby obtaining the codec support information included in the SIP response. Based on information included in the SIP response (e.g., information for identifying terminal 108), NSF 106 retrieves the information stored in step 403 (step 405). In step 407, NSF 106 uses the retrieved information and the codec support information included in the SIP response 406 to determine whether NSF 106 should enter a dynamic codec switching mode operation (e.g., perform steps 210-222). In one embodiment, NSF 106 determines that it should enter a dynamic codec switching mode operation as a result of determining that terminal 102 supports EVS, while terminal 108 does not support EVS but supports AMR-WB.

In the embodiment shown, as a result of NSF 106 determining that it should enter the dynamic codec switching mode operation, NSF 106 begins monitoring (directly or indirectly) the quality of the wireless channel used by terminal 102 to communicate with terminal 108 (step 409). For example, as discussed above, NSF 106 may monitor packet error percentages and/or packet jitter (i.e., variations in packet delay).

In addition, in the embodiment shown, NSF 106 modifies the SIP response 406 and transmits the modified SIP response 408 to terminal 108. In such embodiments, the modified SIP response 408 may be identical to the original SIP response with the exception of the codec support information. For example, the modified SIP response includes codec support information that comprises information identifying AMR-WB as the codec chosen for the call.

Next, terminal 108 transmits to terminal 102 audio data, in the form of an RTP packet 410, comprising encoded audio data encoded using an AMR-WB. NSF 106 receives RTP packet 410. Instead of simply forwarding RTP packet 410 to terminal 102, NSF 106 modifies the RTP packet 410 and transmits to terminal 102 the modified packet 412 so as to cause terminal 102 to start using the EVS AMR-WB IO mode for the call. In this example, NSF 106 modifies the RTP packet by replacing information in the CMR field of the RTP payload header with information to cause terminal 102 to start using the EVS AMR-WB IO mode for the call and then transmits to terminal 102 the modified RTP packet 412. In this way, NSF 106 will not need to perform transcoding.

Next, terminal 102 transmits to terminal 108 an RTP packet 414 comprising encoded audio data encoded according to the EVS AMR-WB IO mode. NSF 106 receives packet 414 and modifies the packet so that it appears that terminal 102 is using AMR-WB instead of EVS AMR-WB IO mode and transmits the modified packet 416 to terminal 108.

Meanwhile, as the call between terminals 102 and 108 continues, NSF 106 is continually monitoring the channel quality, as described above with respect to step 409. In step 411, NSF 106 determines that the channel quality has sufficiently deteriorated that it should now request terminal 102 to switch to using an EVS Primary mode for the call. Accordingly, when NSF 106 receives an RTP packet 418 transmitted by terminal 108 as part of the call, NSF 106 modifies the RTP packet 418 and transmits to terminal 102 the modified RTP packet 420, which includes information (e.g., information in a CMR field) causing terminal 102 to switch to an EVS Primary mode. From this point onward, until terminal 102 switches back to AMR-WB IO mode, NSF 106 will perform transcoding.

Terminal 102 transmits to terminal 108 audio data 422 (e.g., an RTP packet) comprising encoded audio data encoded using an EVS Primary mode. NSF 106 receives the RTP packet 422, performs transcoding to produce a modified RTP packet 424 that includes the transcoded audio data, and transmits the modified RTP packet 424 to terminal 108. That is, after receiving the RTP packet 422, NSF 106 extracts the encoded audio data from the packet, decodes the audio data, and re-encodes the decoded audio data using AMR-WB codec to thereby generate the transcoded audio data. NSF 106 then generates the modified RTP packet 424, which contains the transcoded audio data, and transmits the modified RTP packet 424 to terminal 108.

In some embodiments, in addition to causing terminal 102 to switch to an EVS Primary mode for uplink data when the channel quality falls below a first certain threshold (e.g., packet error exceeds a certain packet error threshold (e.g., 3%)), NSF 106 can be configured to transcode the AMR-WB encoded audio data received from terminal 108 and destined for terminal 102 into EVS Primary encoded audio data and send to terminal 102 the EVS Primary encoded audio data rather than the original AMR-WB encoded audio data (see messages 426 and 428). In some embodiments, NSF 106 performs this additional feature of transcoding in the downlink only if the channel quality falls below a second certain threshold that is lower than the first certain threshold (e.g., packet error exceeds 5%).

When the quality of the channel sufficiently improves, NSF 106 will use the same technique of modifying an RTP packet transmitted by terminal 108 to cause terminal 102 to switch back to the AMR-WB IO mode (see, e.g., messages 430 and 432).

In the above manner, NSF 106 implements dynamic codec switching which has the advantage of minimizing the amount of time that NSF 106 needs to perform transcoding, while taking advantage of EVS when it is most needed (i.e., when the channel between terminal 102 and RAN 104 is of a low quality).

Referring now to FIG. 5, FIG. 5 is a message flow diagram illustrating a process according to some embodiments. In this example, terminal 102 is initiating a session (a voice call) with terminal 108. The process as shown begins with terminal 102 transmitting a SIP Invite 502 to terminal 108. NSF 106 receives the SIP Invite message, which includes codec support information indicating that terminal 102 supports the first audio codec (i.e., EVS) and a second audio codec (e.g., AMR). Specifically, in this example, the SIP Invite message includes a Session Description Protocol (SDP) message that contains one or more attributes of a media descriptor, which attribute(s) contain the codec support information. Next, NSF 106 forwards the SIP Invite 502 to terminal 108.

Additionally, NSF 106 may record in a database (e.g., a file or other database) at least some of the codec support information (step 503). In this example, NSF 106 records in the database information indicating that terminal 102 supports EVS. In this way, when NSF 106 receives from terminal 108 its response to the Invite, NSF 106 can determine the extent to which the codec(s) supported by terminal 102 are compatible with the codec(s) supported by terminal 108.

Terminal 108 receives the SIP Invite 502 and responds to the Invite by transmitting a SIP response 504. In this example, the SIP response is a SIP 200 OK message containing an SDP message comprising codec support information indicating that terminal 108 supports the second audio codec (e.g., AMR), but not EVS.

NSF 106 receives the SIP response 504 thereby obtaining the codec support information included in the SIP response. Based on information included in the SIP response (e.g., information for identifying terminal 102), NSF 106 retrieves the codec support information stored in step 503 (step 505). In step 507, NSF 106 uses the retrieved codec support information and the codec support information included in the SIP response to determine whether NSF 106 should enter a dynamic codec switching mode operation (e.g., perform steps 210-222). In one embodiment, NSF 106 determines that it should enter a dynamic codec switching mode operation as a result of determining that terminal 102 supports EVS, while terminal 108 does not support EVS but supports AMR.

In the embodiment shown, as a result of NSF 106 determining that it should enter the dynamic codec switching mode operation, NSF 106 begins monitoring (directly or indirectly) the quality of the wireless channel used by terminal 102 to communicate with terminal 108 (step 509). For example, as discussed above, NSF 106 may monitor packet error percentages and/or packet jitter (i.e., variations in packet delay).

NSF 106 forward the SIP response 504 to terminal 102.

Next, terminal 102 transmits to terminal 108 an RTP packet 510 comprising encoded audio data encoded according to the AMR codec. NSF 106 receives packet 510 and forwards it to terminal 108.

Next, terminal 108 transmits to terminal 102 an RTP packet 512 comprising encoded audio data encoded according to the AMR codec. NSF 106 receives packet 512 and forwards it to terminal 102.

Meanwhile, as the call between terminals 102 and 108 continues, NSF 106 is monitoring the channel quality, as described above. In step 514, NSF 106 determines that the channel quality has sufficiently deteriorated (e.g., packet error percentage has exceeded a threshold) such that NSF 106 should now request terminal 102 to switch to using an EVS Primary mode for the call for at least the uplink direction. Accordingly, NSF 106 transmits to terminal 102 a message codec switch message 516 for causing terminal 102 to switch to using an EVS primary mode in the uplink direction. Switch message 516 may be an out-of-band (OOB) message (e.g., SIP message, RTCP message, or other control message) or an in-band (IB) message. In this instance, terminal 102 responds with an ACK message 518 and starts using an EVS primary mode.

From this point onward, until terminal 102 switches back to AMR mode, NSF 106 will perform transcoding (step 522). In this example, NSF 106 performs transcoding for uplink data (i.e., converting the uplink EVS encoded data 520 transmitted by terminal 102 into AMR encoded data 524 and forwarding to terminal 108 the AMR encoded data 524).

When the quality of the channel sufficiently improves, NSF 106 will transmit to terminal 102 another coded switch message to cause terminal 102 to switch back to the AMR mode.

In this manner, NSF 106 implements dynamic codec mode switching which has the advantage of minimizing the amount of time that NSF 106 needs to perform transcoding, while taking advantage of EVS when it is most needed.

In some embodiments, in addition to causing terminal 102 to switch to an EVS Primary mode for uplink data when the channel quality falls below a first certain threshold (e.g., packet error exceeds a certain packet error threshold (e.g., 3%)), NSF 106 can be configured to transcode the AMR encoded audio data received from terminal 108 and destined for terminal 102 into EVS Primary encoded audio data and send to terminal 102 the EVS Primary encoded audio data rather than the original AMR encoded audio data. In some embodiments, NSF 106 performs this additional feature of transcoding in the downlink only if the channel quality falls below a second certain threshold that is lower than the first certain threshold (e.g., packet error exceeds 5%).

Figure 6:
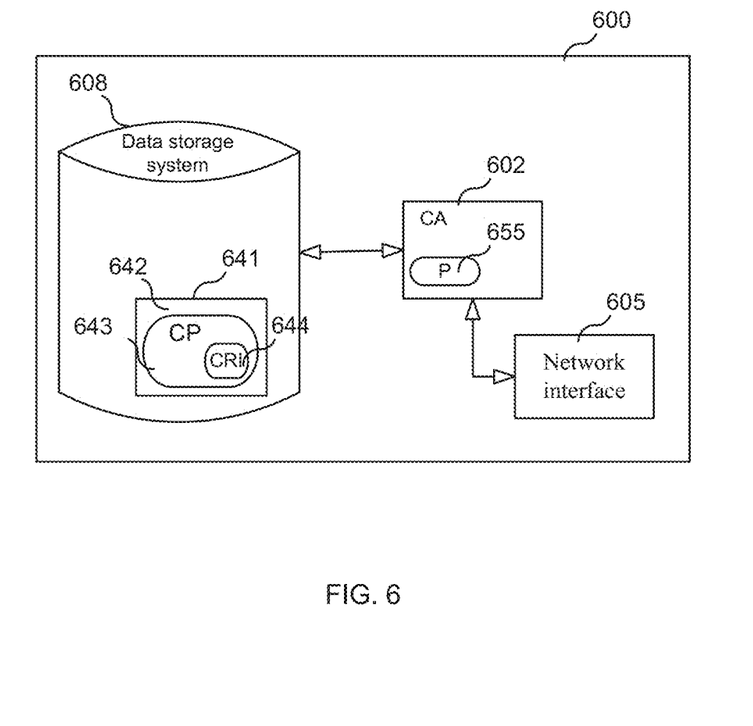
FIG. 6 is a block diagram of a computer system for implementing one or more network functions.

FIG. 6 is a block diagram of a computer system 600 for implementing NSF 106. As described below, computer system 600 may consist of a single computer apparatus 602 or set of computer apparatuses (i.e., computer system 600 may be a cloud computing system).

As shown in FIG. 6, computer system 600 includes at least one computer apparatus (CA) 602, which may include one or more processors 655 (e.g., one or more general purpose microprocessors and/or one or more data processing circuits, such as an application specific integrated circuit (ASIC), field-programmable gate arrays (FPGAs), logic circuits, and the like). In some embodiments, computer system 600 includes a plurality of CAs 602, which may or may not be co-located. Thus, the above described NSF may be implemented in a cloud computing environment. In some embodiments, NSF 106 may correspond to a virtual machine hosted by computer system 600. Computer system 600 further includes: a network interface 605 for use in transmitting and receiving data via a communications link; and a data storage system 608, which may include one or more non-volatile storage devices and/or one or more volatile storage devices (e.g., random access memory (RAM)). In embodiments where computer apparatus 602 includes a microprocessor, a computer program product (CPP) 641 may be provided. CPP 641 includes a computer readable medium (CRM) 642 storing a computer program (CP) 643 comprising computer readable instructions (CRI) 644. CRM 642 may be a non-transitory computer readable medium, such as, but not limited, to magnetic media (e.g., a hard disk), optical media (e.g., a DVD), memory devices (e.g., random access memory), and the like, but not a signal. In some embodiments, the CRI of computer program 643 is configured such that when executed by computer apparatus 602, the CRI causes the computer apparatus 602 to perform steps described above. In other embodiments, computer apparatus 602 may be configured to perform steps described herein without the need for code. That is, for example, computer apparatus 602 may consist merely of one or more ASICs. Hence, the features of the embodiments described herein may be implemented in hardware and/or software.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for dynamic switching of codec modes of operation in a system comprising a first terminal and a second terminal, comprising:

obtaining, by a network session function, first codec support information indicating that the first terminal supports a first audio codec;

obtaining, by the network session function, second codec support information indicating that the second terminal supports a set of one or more audio codecs, wherein the audio codecs supported by the second terminal includes a second audio codec but does not include the first audio codec;

after a session between the first and second terminals has been established and before the session is terminated, the network session function obtaining link quality information (LQI) indicating a quality of a wireless channel between the first terminal and a radio access node, which wireless channel is used by the first terminal during the session to transmit encoded audio data to the second terminal;

the network session function determining, based on the obtained LQI, that the first terminal should switch to a first codec mode of operation in which the first terminal encodes audio data for the session with the second terminal such that the resulting encoded audio data is incompatible with the each one of the audio codecs supported by the second terminal;

as a result of determining based on the LQI that the first terminal should enter the first codec mode of operation, transmitting to the first terminal first codec mode information for causing the first terminal to switch to the first codec mode of operation in which the first terminal encodes audio data for the session with the second terminal such that the resulting encoded audio data is incompatible with the each one of the audio codecs supported by the second terminal;

after transmitting the first codec mode information, receiving from the first terminal first encoded audio data, wherein the first encoded audio data was encoded by the first terminal in accordance with the first codec mode of operation and thus the first encoded data is incompatible with the each one of the audio codecs supported by the second terminal;

decoding the first encoded audio data to produce decoded audio data;

encoding the decoded audio data to produce transcoded audio data compatible with the second audio codec, wherein encoding the decoded audio data to produce the transcoded audio data comprises encoding the decoded audio data using one of: i) an audio codec compatible with the second audio codec and ii) the second audio codec; and transmitting to the second terminal the transcoded audio data.

2. The method of claim 1, wherein the LQI comprises information indicating a packet loss percentage, and determining, based on the obtained LQI, that the first terminal should switch to a first codec mode of operation comprises determining that the indicated packet loss percentage is not less than a packet loss threshold.

3. The method of claim 1, wherein obtaining the second codec support information comprises the network session function receiving a Session Initiation Protocol (SIP) response transmitted by the second terminal in response to a SIP Invite transmitted by the first terminal, the SIP response indicates that the second terminal is not requesting to use the first audio codec for the session and further indicates that the second terminal is requesting to use the second audio codec for the session, and the method further comprises:

the network session function, in response to receiving the SIP response, determining whether the first terminal supports the first audio codec, the network session function, in response to determining that the first terminal supports the first audio codec, using the SIP response to generate a modified SIP response containing codec support information for indicating to the first terminal that the second terminal is requesting to use the first audio codec for the session notwithstanding the fact that the SIP response indicates that the second terminal is not requesting to use the first audio codec for the session, and the network session function transmitting to the first terminal the modified SIP response in place of the received SIP response.

4. The method of claim 3, further comprising:

after receiving the first and second codec support information and before transmitting the first codec mode information to the first terminal, the network session function receiving a packet transmitted by the second terminal to the first terminal, the packet comprising encoded audio data encoded according to the second audio codec, wherein the second audio codec is an Adaptive Multi-Rate Wideband (AMR-WB) codec; and the network session function modifying the packet to produce a modified packet comprising information for causing the first terminal to start using an Enhanced Voice Service (EVS) AMR-WB interoperability (AMR-WB IO) mode for the session; and the network session function transmitting to the first terminal the modified packet so as to cause the first terminal to start using an EVS AMR-WB IO mode for the session.

5. The method of claim 4, further comprising:

after transmitting the modified packet, receiving at the network session function second encoded audio data transmitted by the first terminal to the second terminal, wherein the second encoded audio data is compatible with the second audio codec supported by the second terminal such that the second terminal is operable to decode the second encoded audio data; and forwarding the second encoded audio data to the second terminal.

6. The method of claim 1, wherein obtaining the second codec support information comprises the network session function receiving a Session Initiation Protocol (SIP) Invite transmitted by the second terminal, the SIP Invite indicates that the second terminal is operable to use the second audio codec for the session and the SIP invite further indicates that the second terminal is not operable to use the first audio codec, and the method further comprises:

the network session function, using the received SIP Invite to generate a modified SIP Invite containing codec support information for indicating to the first terminal that the second terminal is operable to use the first audio codec for the session notwithstanding the fact that the SIP Invite transmitted by the second terminal indicates that the second terminal is not operable to use the first audio codec, and the network session function transmitting to the first terminal the modified SIP Invite in place of the received SIP Invite.

7. The method of claim 6, further comprising:

the network session function receiving a SIP response transmitted by the first terminal in response to the modified SIP Invite transmitted by the network session function, wherein the SIP response indicates that the first terminal is requesting to use the first audio codec for the session;

the network session function, in response to receiving the SIP response, determining whether the second terminal supports the first audio codec;

the network session function, in response to determining that the second terminal does not support the first audio codec, using the SIP response to generate a modified SIP response containing codec support information for indicating to the second terminal that the first terminal is requesting to use the second audio codec for the session; and the network session function transmitting to the second terminal the modified SIP response in place of the received SIP response.

8. The method of claim 1, wherein transmitting to the first terminal first codec mode information for causing the first terminal to switch to the first codec mode of operation comprises transmitting to the first terminal a codec switch message.

9. The method of claim 8, wherein the codec switch message is an out-of-band message.

10. The method of claim 9, wherein the second audio codec is an Adaptive Multi-Rate (AMR) codec.

11. A computer program product comprising a non-transitory computer readable medium storing computer readable instructions for performing the method of claim 1.

12. A network session function (NSF) for dynamic switching of codec modes of operation, comprising:

a data storage system; and a processor coupled to the data storage system, the NSF being configured to:

obtain first codec support information indicating that a first terminal supports a first audio codec;

obtain second codec support information indicating that a second terminal supports a set of one or more audio codecs, wherein the audio codecs supported by the second terminal include a second audio codec but does not include the first audio codec;

after a session between the first and second terminals has been established and before the session is terminated, obtain link quality information (LQI) indicating a quality of a wireless channel between the first terminal and a radio access node, which wireless channel is used by the first terminal during the session to transmit encoded audio data to the second terminal;

determine, based on the obtained LQI, that the first terminal should switch to a first codec mode of operation in which the first terminal encodes audio data for the session with the second terminal such that the resulting encoded audio data is incompatible with the each one of the audio codecs supported by the second terminal;

as a result of determining based on the LQI that the first terminal should enter the first codec mode of operation, transmit to the first terminal first codec mode information for causing the first terminal to switch to the first codec mode of operation in which the first terminal encodes audio data for the session with the second terminal such that the resulting encoded audio data is incompatible with the each one of the audio codecs supported by the second terminal;

after transmitting the first codec mode information, receive from the first terminal first encoded audio data, wherein the first encoded audio data was encoded by the first terminal in accordance with the first codec mode of operation and thus the first encoded data is incompatible with the each one of the audio codecs supported by the second terminal;

decode the first encoded audio data to produce decoded audio data;

encode the decoded audio data to produce transcoded audio data compatible with the second audio codec, wherein encoding the decoded audio data to produce the transcoded audio data comprises encoding the decoded audio data using one of: i) an audio codec compatible with the second audio codec and ii) the second audio codec; and transmit to the second terminal the transcoded audio data.

13. The NSF of claim 12, wherein
the LQI comprises information indicating a packet loss percentage, and
the NSF is configured to determine, based on the obtained LQI, that the first terminal should switch to a first codec mode of operation comprises by determining that the indicated packet loss percentage is not less than a packet loss threshold.

14. The NSF of claim 12, wherein
the NSF is configured to obtain the second codec support information by receiving a Session Initiation Protocol (SIP) response transmitted by the second terminal in response to a SIP Invite transmitted by the first terminal,
the SIP response indicates that the second terminal is not requesting to use the first audio codec for the session and further indicates that the second terminal is requesting to use the second audio codec for the session, and
the NSF is further configured to:
determine whether the first terminal supports the first audio codec,
in response to determining that the first terminal supports the first audio codec, use the SIP response to generate a modified SIP response containing codec support information for indicating to the first terminal that the second terminal is requesting to use the first audio codec for the session notwithstanding the fact that the SIP response indicates that the second terminal is not requesting to use the first audio codec for the session, and
transmit to the first terminal the modified SIP response in place of the received SIP response.

15. The NSF of claim 14, wherein the NSF is further configured to:
after receiving the first and second codec support information and before transmitting the first codec mode information to the first terminal, receive a packet transmitted by the second terminal to the first terminal, the packet comprising encoded audio data encoded according to the second audio codec, wherein the second audio codec is an Adaptive Multi-Rate Wideband (AMR-WB) codec; and
modify the packet to produce a modified packet comprising information for causing the first terminal to start using an Enhanced Voice Service (EVS) AMR-WB interoperability (AMR-WB IO) mode for the session; and
transmit to the first terminal the modified packet so as to cause the first terminal to start using an EVS AMR-WB IO mode for the session.

16. The NSF of claim 15, wherein the NSF is further configured to:
after transmitting the modified packet, receive second encoded audio data transmitted by the first terminal to the second terminal, wherein the second encoded audio data is compatible with the second audio codec supported by the second terminal such that the second terminal is operable to decode the second encoded audio data; and
forward the second encoded audio data to the second terminal.

17. The NSF of claim 12, wherein
the NSF is configured to obtain the second codec support information by receiving a Session Initiation Protocol (SIP) Invite transmitted by the second terminal,
the SIP Invite indicates that the second terminal is operable to use the second audio codec for the session and the SIP invite further indicates that the second terminal is not operable to use the first audio codec, and
the NSF is further configured to:
use the received SIP Invite to generate a modified SIP Invite containing codec support information for indicating to the first terminal that the second terminal is operable to use the first audio codec for the session notwithstanding the fact that the SIP Invite transmitted by the second terminal indicates that the second terminal is not operable to use the first audio codec, and
transmit to the first terminal the modified SIP Invite in place of the received SIP Invite.

18. The NSF of claim 17, wherein the NSF is further configured to:
receive a SIP response transmitted by the first terminal in response to the modified SIP Invite transmitted by the NSF, wherein the SIP response indicates that the first terminal is requesting to use the first audio codec for the session;
in response to receiving the SIP response, determine whether the second terminal supports the first audio codec;
in response to determining that the second terminal does not support the first audio codec, use the SIP response to generate a modified SIP response containing codec support information for indicating to the second terminal that the first terminal is requesting to use the second audio codec for the session; and
transmit to the second terminal the modified SIP response in place of the received SIP response.

19. The NSF of claim 12, wherein the NSF is configured to transmit to the first terminal first codec mode information for causing the first terminal to switch to the first codec mode of operation by transmitting to the first terminal a codec switch message.

20. The NSF of claim 19, wherein the codec switch message is an out-of-band message.

21. The NSF of claim 20, wherein the second audio codec is an Adaptive Multi-Rate (AMR) codec.

* * * * *